Figure 1:
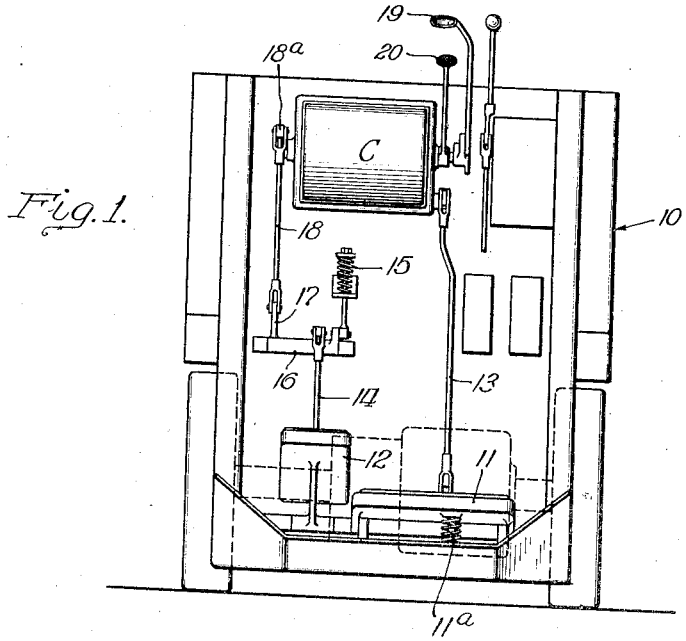

Dec. 23, 1941.  B. ULINSKI  2,267,381
CONTROLLER
Filed Feb. 3, 1938  10 Sheets-Sheet 1

Inventor:
B. Ulinski
By: A. H. Golden Atty.

Dec. 23, 1941.  B. ULINSKI  2,267,381
CONTROLLER
Filed Feb. 3, 1938  10 Sheets-Sheet 4
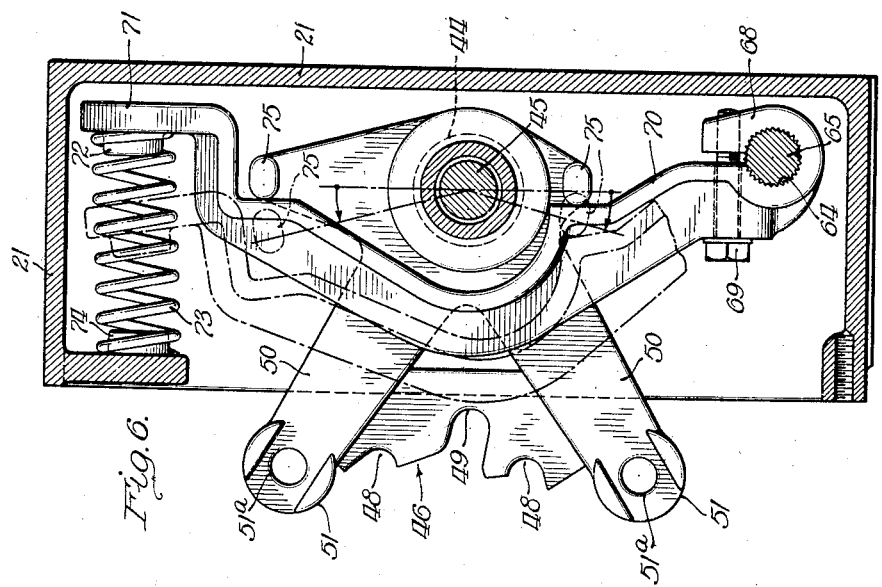
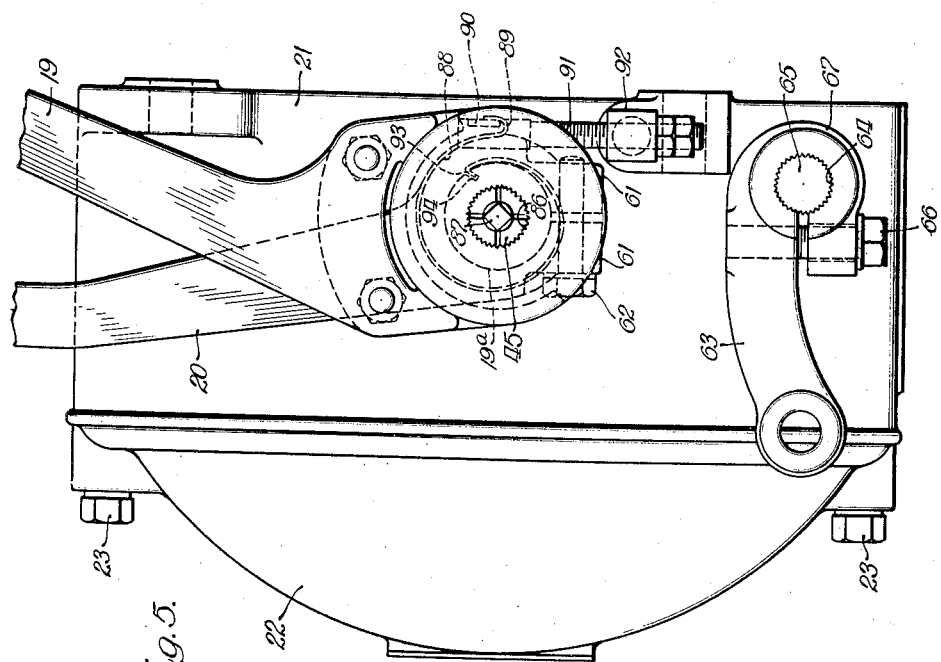
Inventor:
B. Ulinski
By: A. H. Golden Atty.

Dec. 23, 1941.   B. ULINSKI   2,267,381
CONTROLLER
Filed Feb. 3, 1938   10 Sheets-Sheet 5
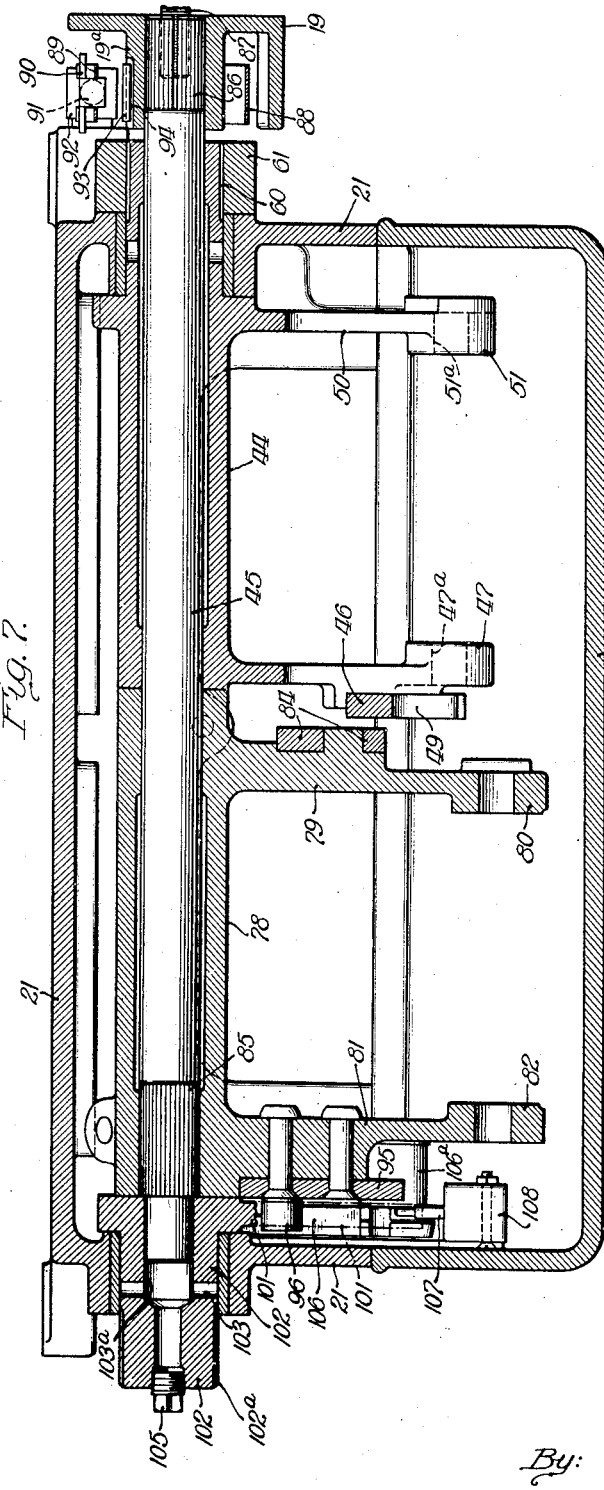
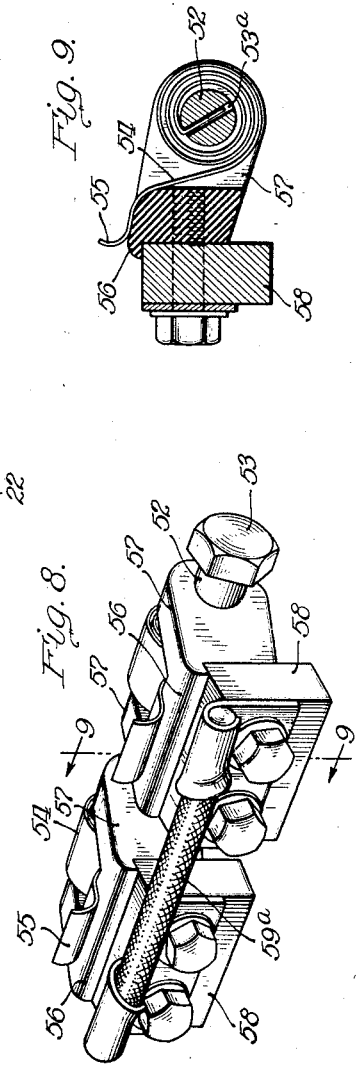
Inventor:
B. Ulinski
By: A. H. Golden Atty.

Dec. 23, 1941.　　　　B. ULINSKI　　　　2,267,381
CONTROLLER
Filed Feb. 3, 1938　　10 Sheets-Sheet 6
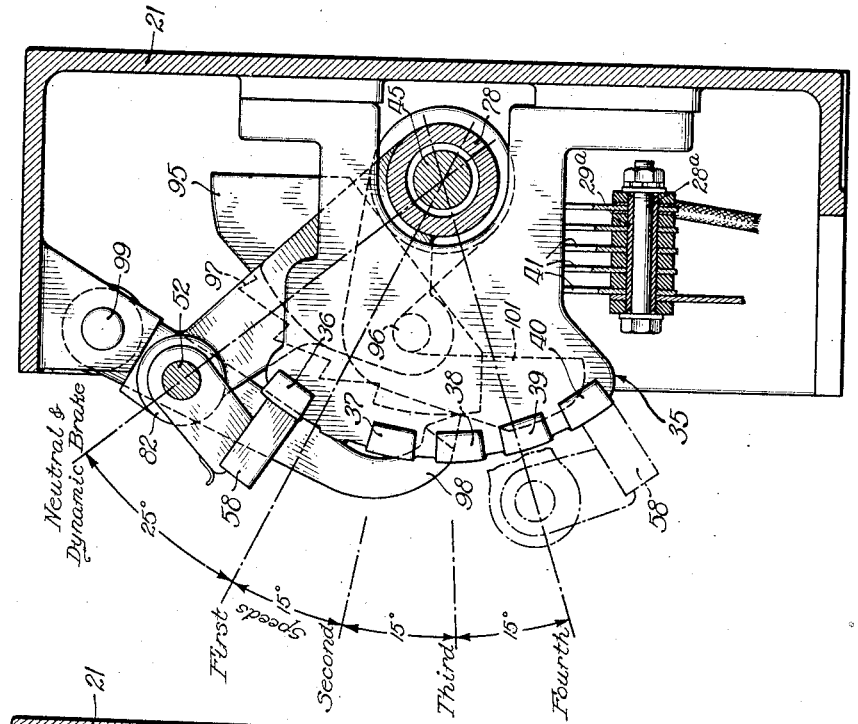
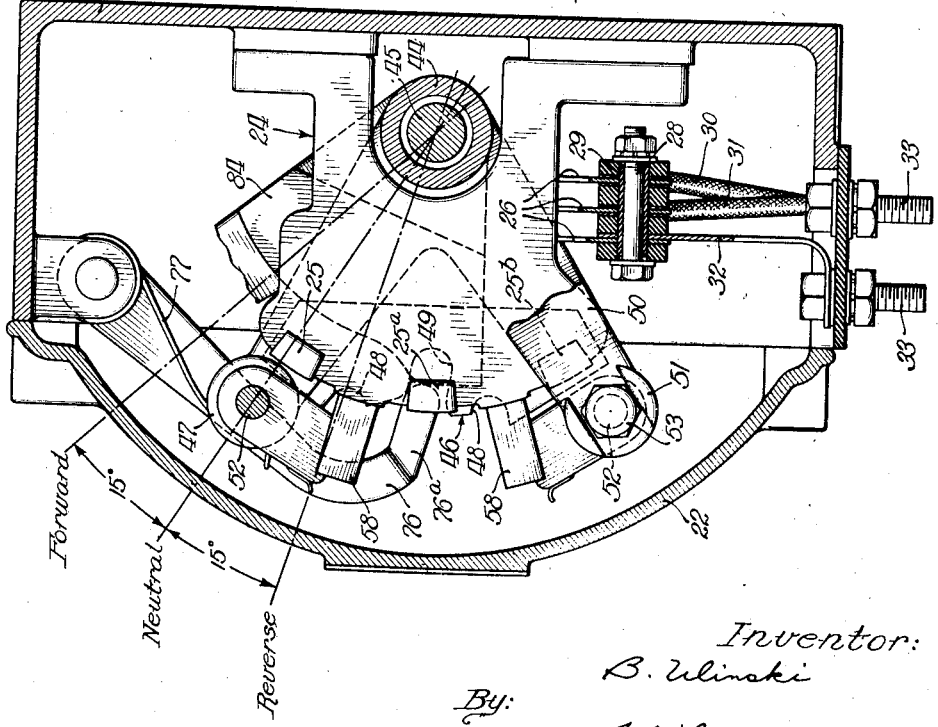

Dec. 23, 1941.　　　　B. ULINSKI　　　　2,267,381
CONTROLLER
Filed Feb. 3, 1938　　　10 Sheets-Sheet 7
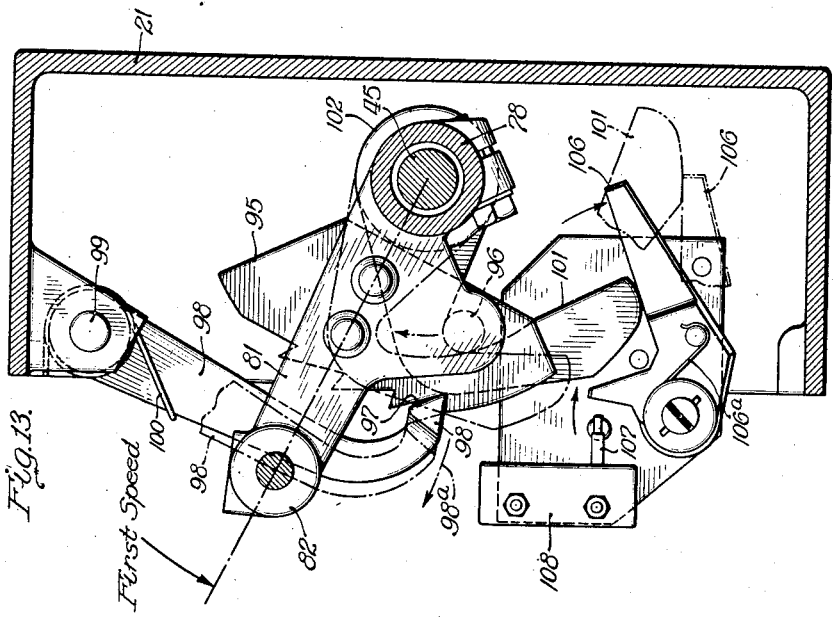
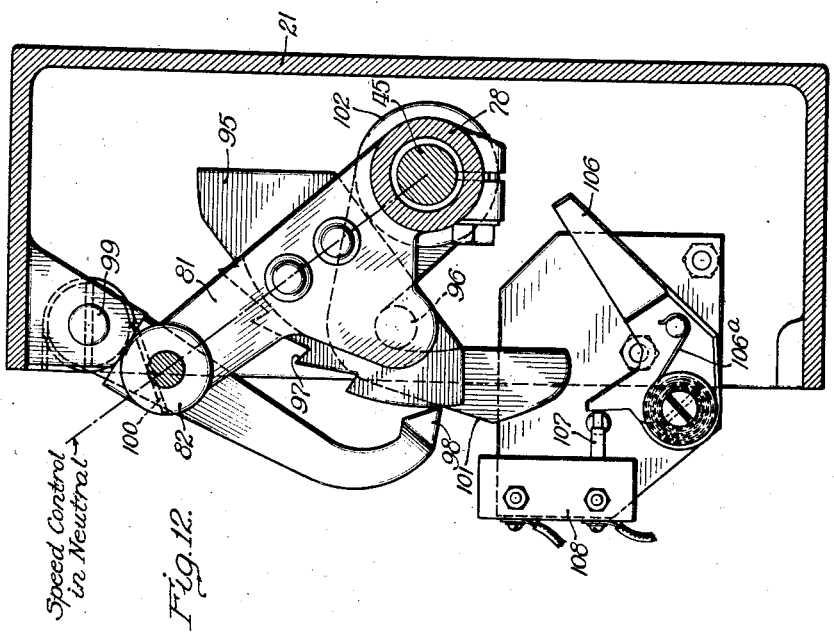
Inventor:
B. Ulinski
By:
A. H. Golden, Atty.

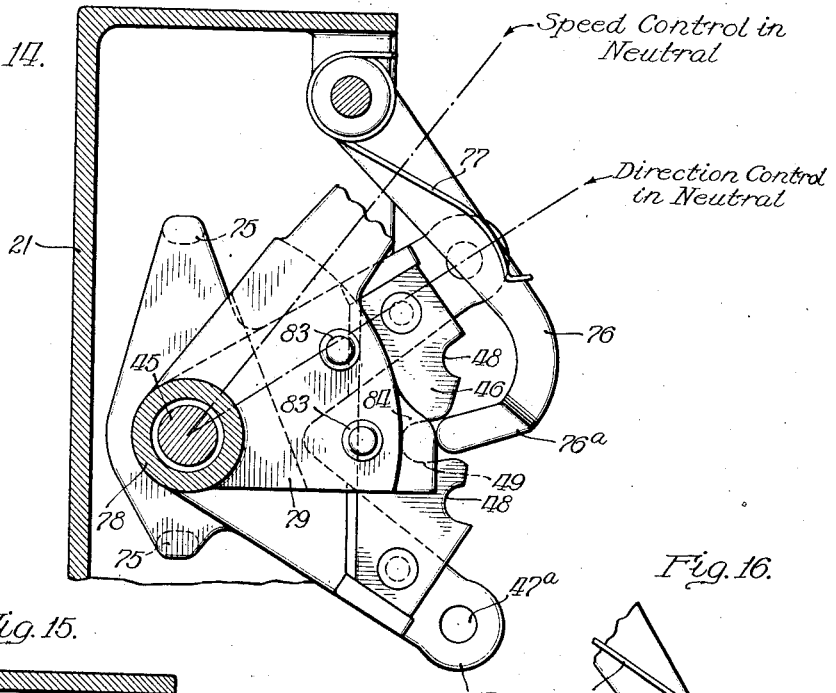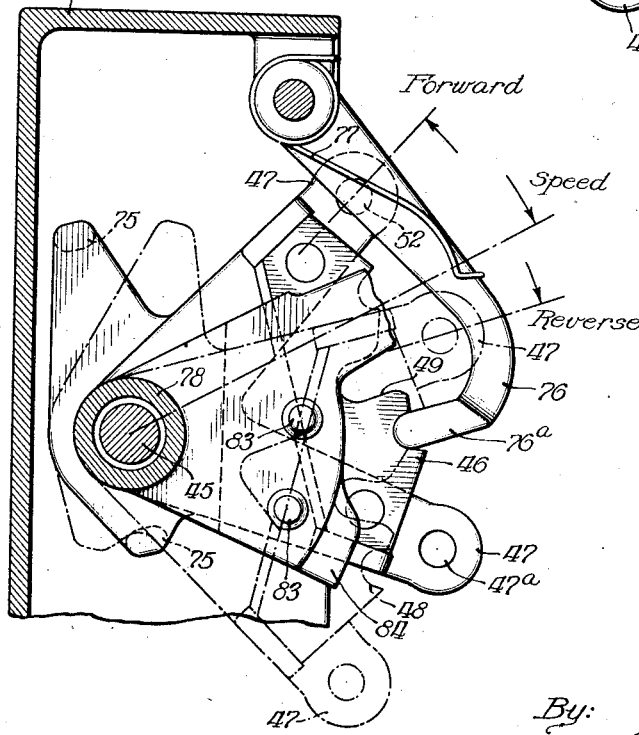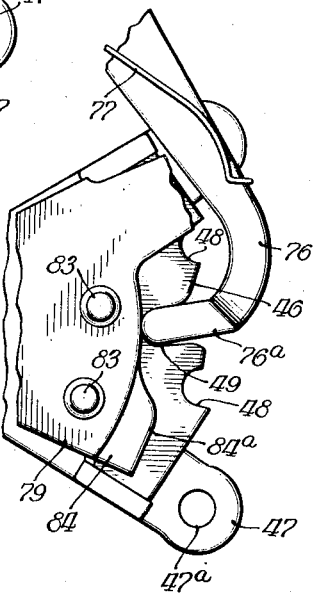

Dec. 23, 1941.                B. ULINSKI                2,267,381
                               CONTROLLER
                         Filed Feb. 3, 1938            10 Sheets-Sheet 9
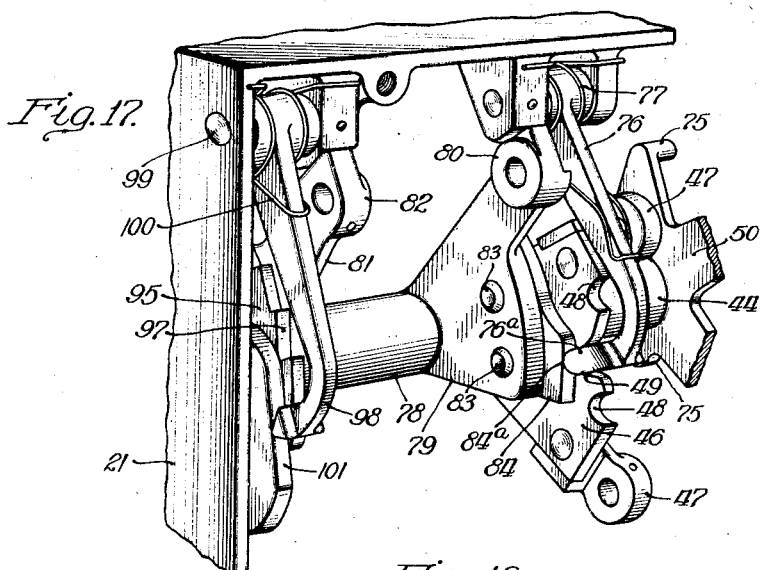
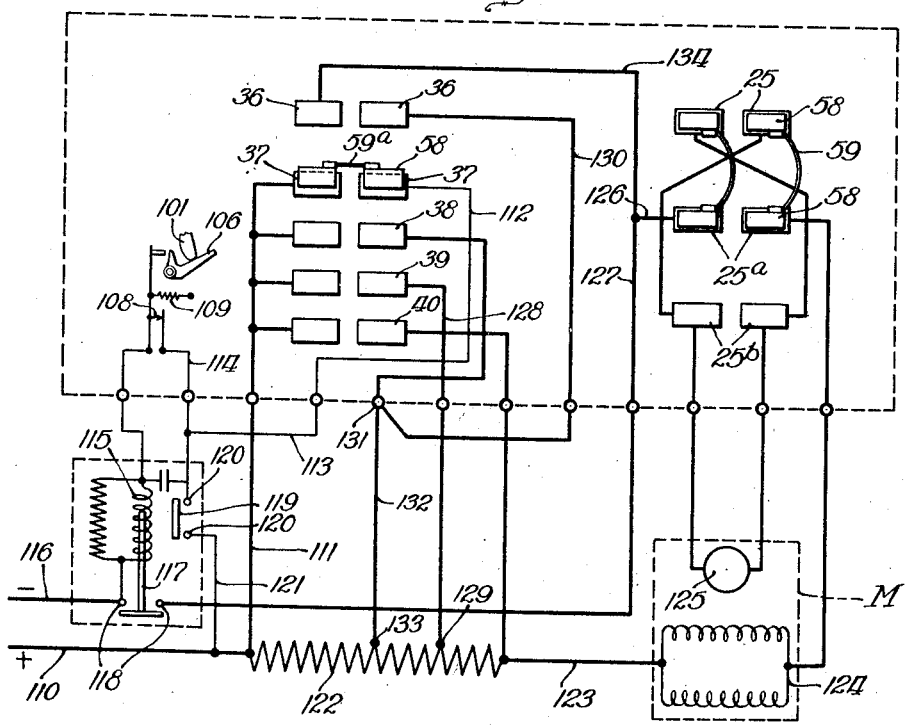
Inventor:
B. Ulinski
By: A.H. Golden Atty.

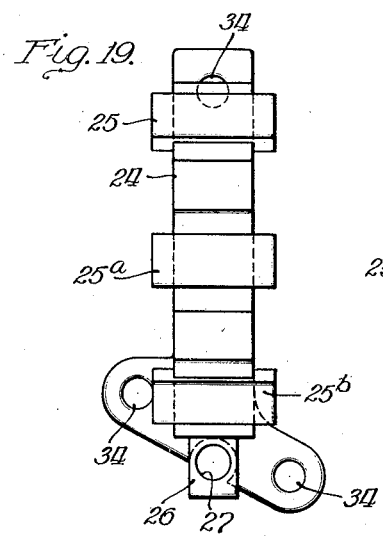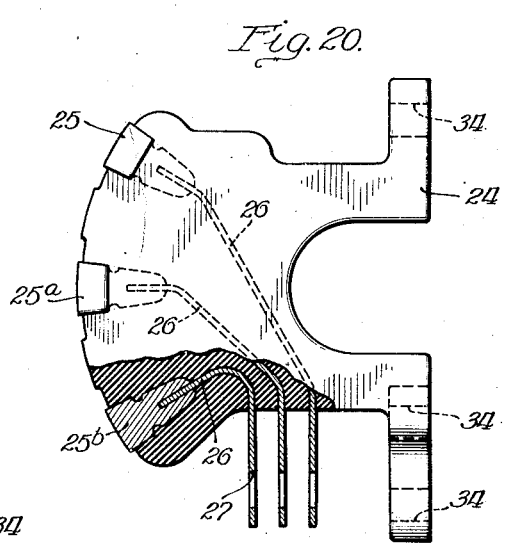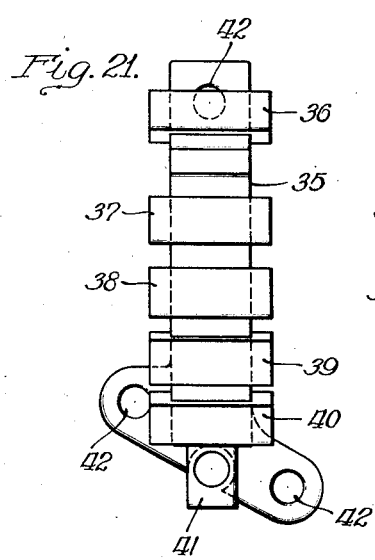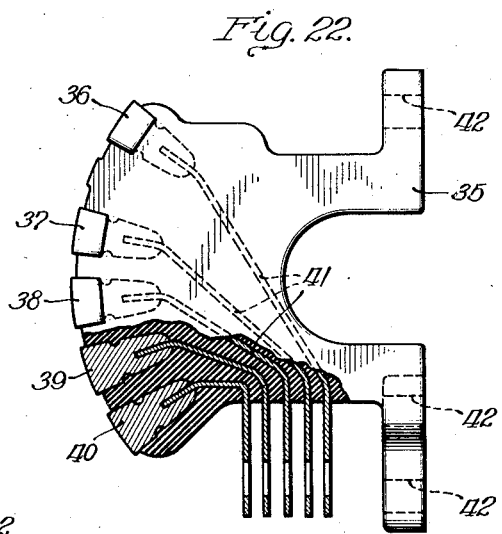

Patented Dec. 23, 1941

2,267,381

UNITED STATES PATENT OFFICE 2,267,381

CONTROLLER

Bronislaus Ulinski, Chicago, Ill., assignor to The Yale & Towne Manufacturing Company, Stamford, Conn., a corporation of Connecticut Application February 3, 1938, Serial No. 188,511

23 Claims. (Cl. 172—179)

This invention relates to a controller of the type used in an electric industrial truck.

Those skilled in the art will readily appreciate the rough handling which such controllers receive, and will therefore understand the need for a special design. In the controller of my invention, I have departed from the usual construction standard in the art, and am utilizing a stationary drum instead of a movable drum for carrying the various speed contact segments. Because the movable elements of my controller are relatively light and simple, my construction contributes very smooth operation of the moving contact members into their various speed positions. It will be well to indicate that my controller does, however, have the usual arrangement of a speed controller with its contacts, and a direction controller with its contacts.

The moving contact members which I have developed to be utilized in connection with the combination just set forth, both for the speed and direction controller portions, are extremely novel and allow for smooth operation, with no appreciable wear. The stationary portions of my controller are of special interest. The copper segments forming the contact elements thereof are adapted to be molded into an insulated base at the time of the manufacture of the base. The arrangement is such furthermore, that the usual contact pigtails are eliminated and flat contact strips substituted therefor, and also united with the base when the base is molded. The molded base carrying the contacts is itself formed so as to be readily secured in the controller casing.

As an important feature of my new controller, the movable speed controller contacts are arranged for movement both by a foot pedal and by a manually operated lever, there being means whereby the speed contacts will tend to move into neutral position immediately upon the lifting of the foot pedal to a predetermined position.

A most important feature of my invention is the means for preventing arcing through the segments forming the various contact members. This is accomplished by incorporating in each of the speed circuits a contactor circuit, the contactor circuit being itself arranged to be closed just after the contacts are placed in first speed and just prior to the release of the contacts for movement from an advanced speed position into neutral speed. Since the closing of the contactor circuit follows the closing of the first speed circuit, and since the opening of the contactor circuit precedes the opening of any speed circuit, it follows that all arcing takes place in the contactor circuit.

In connection with this construction, I make it necessary to move my movable contact members slowly through the various speeds. This I do by placing the contactor circuit in the first speed circuit, and by utilizing an electro-magnetic relay in the contactor circuit which is slow of operation, and which therefore requires the maintenance of its circuit through the first speed contacts for a predetermined period of time in order that it may fully operate to close the contactor circuit, and thereafter close its own circuit independently of the first speed contact members. In operating my controller, the operator will therefore be required to put the controller in first speed and keep it there for a short interval, then go on to the various speeds.

In this same connection, once the contactor circuit is opened, which happens whenever it is desired to go from a higher speed to a lower speed as I point out below, I make it impossible to close the contactor circuit except by the movement of the controller back into a first speed position. This operation is important, because, as I have already indicated, I find it desirable to prevent the movement of the speed controller contacts from an advanced speed position to a less advanced speed position and then to an advanced speed position once again, without first breaking the contactor circuit and starting from first speed. Therefore, because my contactor circuit may only be closed, once it is broken, by the placing of the speed controller contacts into first speed position, it follows that the operator will be required to go into first speed whenever he cuts down the speed of the truck and desires to pick up speed once again.

Thus, for example, if the truck is running along in fourth speed and the operator wishes to go into second speed, he will have to return the speed controller to neutral, and thereafter go through first speed back into second, pausing a sufficient length of time in first speed to allow the operation of the contactor to close the contactor controlled portion of the speed circuits, and for perpetuating the contactor circuit independently of the first speed contacts thereafter.

In order to obtain the operation just described, I arrange for a foot pedal to operate the movable speed contacts through a one-way connection, the pedal being adapted to move the speed contacts from neutral position through the several speed positions, but being movable in a reverse direction independently of the speed contacts. I preferably arrange for pawl and ratchet means to hold the speed contacts in any advanced speed position, but provide for the separation of the pawl and ratchet means when the foot pedal is lifted to a predetermined position, which will correspond roughly to a neutral speed position, and which will only take place after the contactor circuit is opened by the said foot pedal.

It may be well to indicate at this time that the initial downward movement of the speed contacts by the foot pedal will act to move the speed contacts into first speed position, and thereafter, while the contacts are in first speed position, will close the contactor circuit through the operation of an appropriate switch.

In cooperation with my speed controller, I utilize a direction controller, this combination being a usual one in the art, as I have already indicated. My direction controller is of the same general construction as my speed controller, using similar types of movable and stationary contact members. I have an interlocking arrangement between my speed controller and direction controller which is of the same general type well known in the art, but is of a new specific construction which will be described and hereinafter claimed.

As an additional feature of my invention, I arrange for the speed controller contact members closing a circuit when in neutral position, and with the direction controller in an appropriate directional position. The armature of the truck will be caused to act as a generator under such circumstances, forcing current through a portion of the traction resistance. In effect, the motor acts as a built-in dynamic brake under such conditions, whereby to control the speed of the truck down hills or down ramps, as will be readily perceived by those skilled in the art.

In addition to the various features which I have now described generally, there are many other important contributions incorporated in my new controller which will be described in connection with the detailed description which follows, and which will be claimed thereafter. I believe that the general discussion of the more important features of my invention will be helpful in an understanding of the detailed description which follows in connection with the drawings wherein a preferred specific embodiment of my invention is shown.

Figure 2:
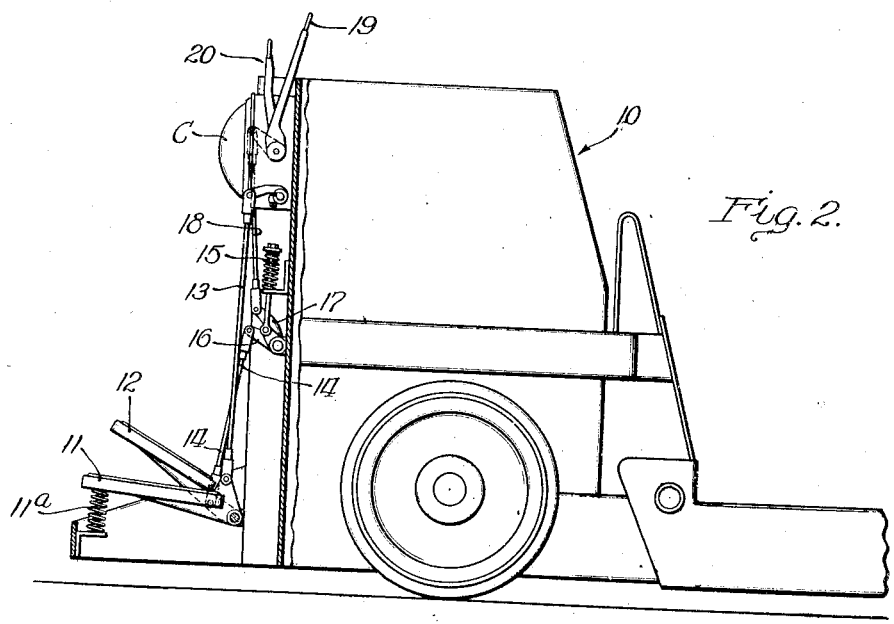
Figure 3:
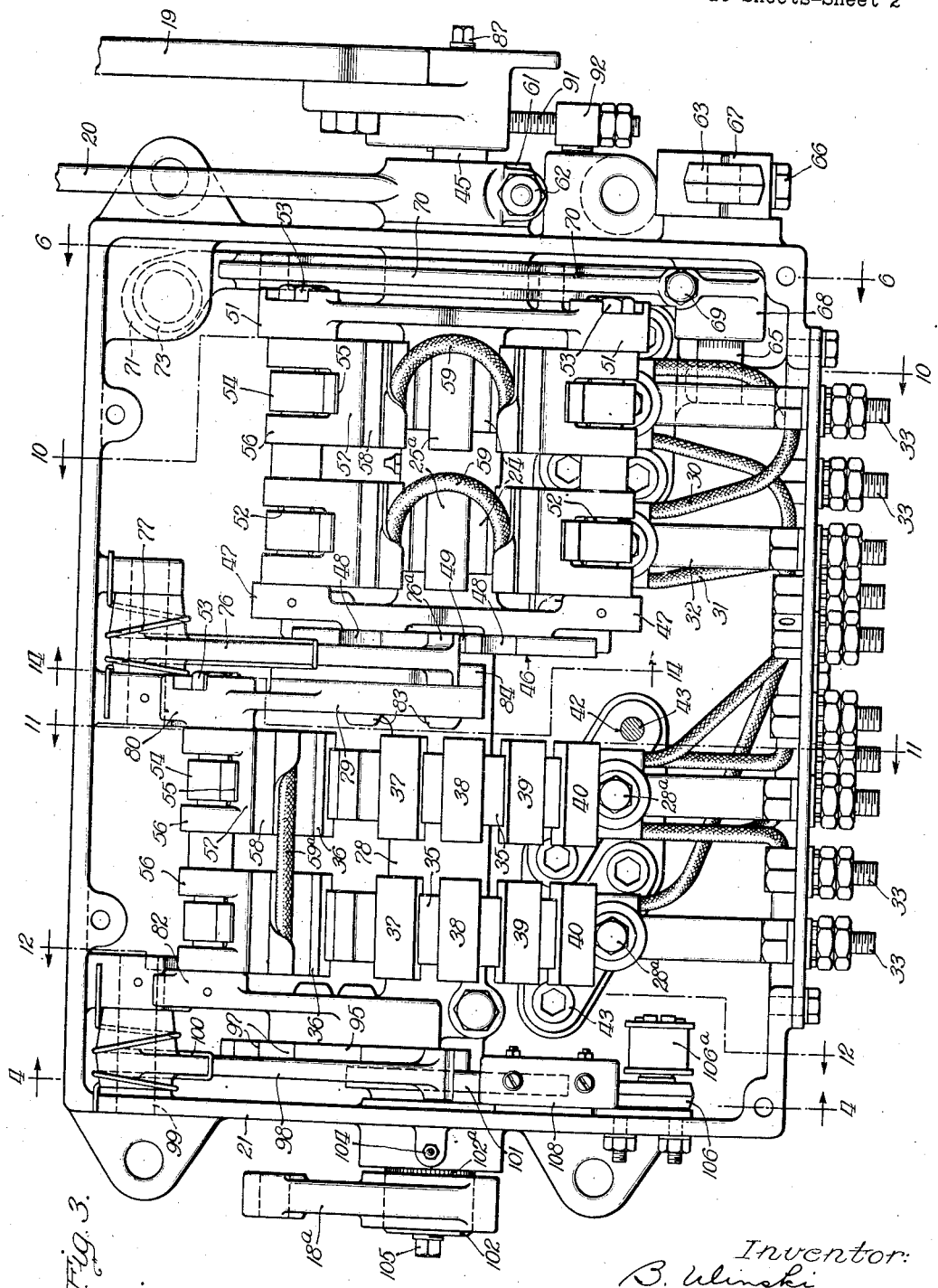
Figure 4:
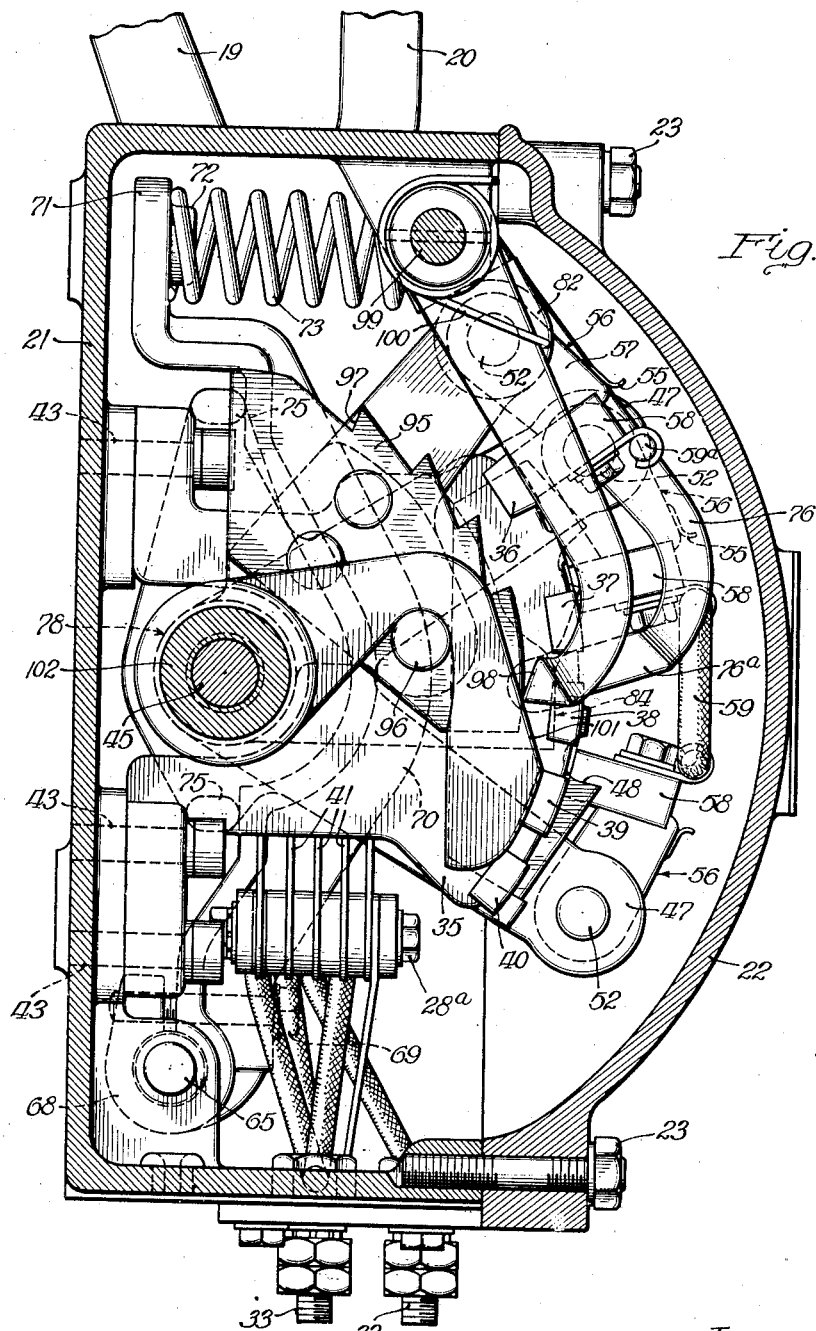

In the drawings, Fig. 1 is a front view of the operator's platform of an electric industrial truck, showing my controller applied thereto and connected to the foot control pedals of the truck. Fig. 2 is a partial section and side view of the construction shown in Fig. 1. Fig. 3 is a front view of my controller taken from Fig. 1 and with the front cover plate thereof removed. Fig. 4 is a section taken along lines 4—4 of Fig. 3. Fig. 5 is a side view of the right end of the controller looking at Fig. 3. Fig. 6 is a section taken along lines 6—6 of Fig. 3. Fig. 7 is a section taken through the casing of my controller and showing the main carrying shaft and the speed controller sleeve and its arms, and the direction controller sleeve and its arms, mounted thereon. Fig. 8 is a perspective view of a pair of moving contact members, while Fig. 9 is a section through lines 9—9 of Fig. 8. Fig. 10 is a view taken along lines 10—10 of Fig. 3, while Fig. 11 is a view taken along lines 11—11 of Fig. 3, certain parts being not shown for purposes of clarity. Figs. 12 and 13 are taken along lines 12—12 of Fig. 3 and illustrate the operation of the contactor switch and the pawl and ratchet mechanism. Figs. 14 and 15 are sections taken along lines 14—14 of Fig. 3 and illustrate the interlock between the speed control and the direction control. Fig. 16 is a view of part of Fig. 15 illustrating the parts in a further position. Fig. 17 is a perspective view of a portion of my controller illustrating the construction of the sleeves which carry the moving contacts of the direction and speed controllers, the interlocking means between the two controllers, and the pawl and ratchet mechanism for controlling the speed controller sleeve. Fig. 18 is a preferred wiring diagram of my controller. Figs. 19 and 20 are respectively a front view and a partial section through one of the stationary portions of my direction controller, while Figs. 21 and 22 are corresponding views of one of the stationary portions of my speed controller.

Referring now more particularly to the drawings, an industrial truck of which my invention is applied is designated by reference numeral 10 in Figs. 1 and 2. It carries a direction control pedal 11 and a speed control pedal 12. A shaft 13 connects the direction control pedal 11 with means in the controller C for operating the controller in a manner to be described presently. A spring 11a maintains the pedal 11 raised as in Figs. 1 and 2 until depressed by the weight of the trucker's foot. The speed control pedal is connected to rod 14, and is thus maintained in raised position by a spring 15. Through links 16, 17, 18 and 18a, rod 14 and pedal 12 are connected to the speed controller portion of my controller C for operating it in a manner to be described. For additionally operating the controller, I use a manually operated speed control handle 19 and a manually operated direction control handle 20.

In Figs. 4 and 5, my controller casing is shown as having a main body portion 21 and a cover 22 suitably held in position by stud bolts 23. The stationary portions of the speed and direction controllers are secured to the back plate of the controller casing 21, as is probably best shown in Figs. 3 and 4 taken in connection with Figs. 19–22.

One of the stationary direction controller portions is shown in Figs. 19 and 20, and is designated by reference numeral 24. There are two of these portions 24, each of which is formed of a plastic molded about extruded copper segments 25, 25a and 25b, that are secured to flat contact strips 26 which traverse the molded body 24. Each of the contact strips 26 is perforated as at 27 for the passage of a securing bolt 28 (Fig. 10) and an insulating sleeve 29 which are adapted to secure the contact strips 26 to suitable conductors 30, 31 and 32. These conductors are in turn connected in predetermined order to a series of terminals 33 carried by the lower side of the controller casing 21. The molded body 24 is itself formed with bores 34 for the passage of suitable bolts whereby it may be secured to the back of the casing 21.

In Figs. 21 and 22, I show a molded member 35 carrying a series of contact segments 36, 37, 38, 39 and 40 which are assembled therein in the same manner as the contact segments 25, 25a and 25b of the molded portion 24. As in the case of the direction controller, the speed controller has two identical portions 35. Each of the contact segments 36, 37, 38, 39 and 40 has a contact strip 41 similar to each of the contact strips 26 and similarly held by a bolt 28a and an insulation sleeve 29a whereby to be connected through suitable conductors and in predetermined order to the series of terminals 33. Each of the molded members 35 is formed with bores 42 for the passage of suitable bolts 43 whereby to secure the molded members 35 to the back of the controller casing 21, in the same manner as the molded members of the direction controller.

The construction and mounting of the stationary portions of my controller I consider most important and most effective in the carrying out of my invention, and I shall lay claim thereto in a divisional application.

I shall now describe the sleeve which carries the movable contacts of the direction controller, whereby said movable contacts may be brought into cooperation with the various segments carried by the molded members 24 of the direction controller. This sleeve is probably best shown in Figs. 7 and 17, although it is shown also in several other figures. It is designated by reference numeral 44, and is adapted for free rotation on a longitudinal main shaft 45 carried by my controller. At its left end, the sleeve 44 has secured thereto a star wheel 46 carrying extended ears 47 and having shallow holding or detent notches 48 and a central deep locking notch 49. At its extreme right end, the sleeve 44 carries a plate 50 which carries upper and lower ears 51 corresponding to the ears 47 and axially aligned therewith. A shaft 52 connects the lower ears 47 and 51 by passing through the bores 47a and 51a therein, as shown in Fig. 3. The shaft 52 has a bolt head 53 at one end thereof and is suitably secured by a pin at the other end thereof. A similar shaft 52 connects the upper ears 47 and 51.

In Figs. 8 and 9, I show the manner in which I mount my contacts on each of the shafts 52. In Figs. 8 and 9, I illustrate a pair of contacts used in my speed controller, but the mounting of said contacts is exactly the same as that in the direction controller. Each of the shafts 52 is slotted as at 53a, as is probably best shown in Fig. 9, whereby to house the ends of a pair of springs 54, each of which has an opposite end 55 pressing on an insulating block 56 which is formed with a pair of side arms 57 for free rotation about the shaft 52 under the pressure of its spring 54. Each insulation block 56 supports a contact brush 58 which is pressed against one of the three contact segments 25, 25a and 25b of each molded body 24 of the direction controller, depending on the positioning of the direction controller sleeve 44. The insulation blocks 56 carried on the lower and upper shafts 52 of the direction controller are of identical construction, except that they are in reversed positions. The contact members 58 of the direction controller are connected in vertical pairs by conductors 59 to function properly in the controller circuit, as will be hereinafter described. As seen in Fig. 8, the contact brushes 58 of the speed controller are in horizontal connection through conductor 59a.

The controller sleeve 44 extends through the casing 21 of the controller and terminates in a serrated portion 60 (Fig. 7) to which is secured the manually operated handle 20, which has a split sleeve portion 61 (Fig. 5) whereby it may be readily secured through a bolt 62 about the serrations 60, the handle 20 being thereafter able to rotate the sleeve 44 at all times. This rotation is, however, under the control of the direction control pedal 11 which is secured by the shaft 13 to a link 63, shown in Fig. 5. The link 63 is secured to the serrated extension 64 of a shaft 65 through means of bolt 66 and a split sleeve 67 formed as a part of said link 63.

The shaft 65 extends into the controller through the casing 21, as is best shown in Fig. 6, the inner serrated portion 64 carrying a split sleeve 68 secured thereto by a bolt 69. The split sleeve 68 is an extension of a cam 70 which extends upwardly to the upper end of the casing, terminating in a flat portion 71 having an integral lug 72 whereby it is maintained in operative relation to a spring 73 operating between the lug 72 and a similar lug 74 secured to the controller casing 21.

At this time, it will be well to indicate that the plate 50 at the right hand end of the direction controller sleeve 44 in Fig. 17 which carries the ears 51, best shown in Fig. 6, has also upwardly and downwardly extending portions which are turned outwardly into lugs 75, which cooperate with the cam 70.

In Fig. 6, it will be seen that when cam 70 is in its full line position, which is its position when the direction control pedal 11 is in its upward raised position, that is, with the trucker not standing thereon, it will maintain the controller sleeve 44 in its full line position illustrated in Fig. 6. In this position of the parts, the two shafts 52 carrying the upper and lower contact members 58 will be maintained in a neutral position illustrated in Fig. 10. Since the foot pedal 11 is held upward by the relatively powerful spring 11a, while spring 73 assists also in the positioning of cam 70, it will be obvious that rotation of controller sleeve 44 by handle 20 will be effectively resisted. If the foot pedal 11 is now depressed, however, it is quite obvious that the cam portion 70 will be pulled into its dotted line position illustrated in Fig. 6, against the pressure of spring 73, thereby allowing a rotary movement of the controller sleeve 44 and its lugs 75 into either of the dotted line positions shown occupied by the lugs.

It will be appreciated that clockwise rotation of controller sleeve 44 by its handle 20 in Fig. 6 will now bring the contact members 58 into the forward speed position shown in dot and dash lines in Fig. 10. Counterclockwise movement will bring the contact members into the reverse position illustrated in dot and dash lines in Fig. 10. With the direction controller sleeve 44 in a particular directional position, it is extremely simple for the operator to stop the truck by simply taking his foot off the pedal 11. The springs 11a and 73 will act on cam 70, moving the cam to its full line position of Fig. 6, the cam 70 through lugs 75, acting to rotate the controller sleeve 44 into its neutral position of Fig. 10. With the direction controller in neutral, the truck cannot move, regardless of the position of the speed controller.

The controller sleeve 44 is controlled also by a pawl 76 spring pressed by a spring 77 into one of the notches 48, 49 of the star wheel 46 of the sleeve 44, in a manner to be described hereinafter.

The speed controller utilizes a sleeve 78 (Fig. 17) similar in many ways to direction controller sleeve 44. Speed controller sleeve 78 carries a right end plate 79 formed with a single ear 80 and a left hand plate 81 carrying a single ear 82. The ears 80 and 82 carry a shaft 52, which in turn carries contact brushes or members 58 supported exactly like those shown in Fig. 8 and described in connection with the operation of the direction controller. These contact members 58 cooperate of course with the speed controller segments 36—40, as will be described hereinafter.

The right hand plate 79 of the sleeve 78 has riveted thereto as by rivets 83 a cam 84 which cooperates with the hook 76, which was described as controlling the star wheel 46 carried by the direction controller sleeve 44. The purpose of this control is to prevent the reversal of the motor when it is in speed. Thus, it is necessary to lock the direction controller sleeve against movement except when the speed controller is in neutral. In Fig. 17, the speed controller sleeve 78 is shown in a position corresponding to neutral, in which position the high point 84a of the cam 84 is opposite the horizontally extending portion 76a of the hook 76. Cam portion 84a holds the part 76a of hook 76 somewhat in raised relation to the notch 49 whenever the speed controller sleeve 78 is in neutral. This relation of the parts is probably best shown in Fig. 14. With the parts as there positioned, it will be appreciated that direction controller sleeve 44 may be rotated as in Fig. 15, either to a forward or reverse position, the forward position being illustrated in full lines in Fig. 15, while the reverse position is illustrated in dotted lines. The notches 48 cooperate with hook 76 to hold the controller sleeve yieldingly in its positions.

In Fig. 16, the cam 84 is shown rotated to a position corresponding to first speed of the speed controller, thus bringing the raised portion of the cam 84a considerably below the horizontally extending portion 76a of the hook 76. The hook 76 will now be held by its spring 77 fully projected into the deep or locking notch 49, in which position of the parts it will be impossible to rotate the sleeve 44 and its contact members. This will have the effect of locking the direction controller sleeve in neutral, which is its position in Figs. 14 and 16 when the speed controller sleeve 78 is in any speed position.

While the interlocking relation between the speed and direction controller just described is broadly well known in the art, the feature of the utilization of the deep notch 49 and the raised cam portion 84 is novel, since because of this construction, it is possible to use the plate 46 with its notch 49 and shallower depressions 48 as a star wheel, while at the same time using the plate 46 as a locking member for the direction sleeve 44. In prior art devices, it has been customary to have a locking device for the direction controller and a star wheel in addition.

Referring now back to speed controller sleeve 78, in Figs. 7 and 17, it will be noted that the sleeve 78 is forced onto the serrated portion 85 of the main shaft 45 so as to be rotated together with that shaft. The extreme other end of the shaft 45 extends outwardly of the casing and terminates in a further serrated portion 86, to which is secured the speed handle 19. In the case of speed handle 19, the serrated portion 86 of the shaft is drilled, grooved and screw threaded in the nature of an outwardly extending chuck, so that the entry of a screw threaded stud 87 (Fig. 5) tends to expand the serrated portion 86 against the sleeve portion 19a of the handle 19.

A coiled spring is provided for maintaining the shaft 45 and the speed controller sleeve 78 in a neutral position. This spring is designated by reference numeral 88 in Fig. 5 and has a terminal end 89 secured under a stud 90 carried by an adjusting bolt 91 threaded into a lug 92 integral with the casing of the controller. The other end of the spring 88 terminates at 93, and is housed in a notch 94 on the sleeve portion 19a of the handle 19. Because of its mounting between the casing and the sleeve 19a of the handle 19, which is of course integral with the shaft 45, in turn secured to the speed control sleeve 78, the spring 88 will act to maintain the said sleeve 78 in a neutral position, and will resist the rotation of the sleeve from neutral. It will further be understood that the handle 19 is adapted to rotate the sleeve 78 at all times from a neutral speed to any particular advanced speed position against the opposition of the spring 88.

As is probably best shown in Figs. 4, 7, 12 and 13, the left hand plate 81 of the sleeve 78 which carries the ear 82, has secured thereto as by rivets, a ratchet plate 95, one of the rivets extending beyond the ratchet plate 95 and terminating in a head 96. The ratchet plate 95 has a series of teeth 97 cooperating with a pawl 98 pivoted on shaft 99 and spring pressed by a spring 100 into engagement with the teeth.

The rivet head 96 is the means whereby motion is imparted to the ratchet plate 95 and therefore to the sleeve 78 by the foot pedal 12, operating through its link connection 18 and 18a with the controller. This operation by pedal 12 is accomplished through a cam member 101 which I shall for convenience call an operator hereinafter.

The operator 101 has a sleeve portion 102 which extends from the inside of the casing 21 outwardly of the casing and is bored diametrically as at 103 whereby lubricating material may enter the same through lubricating nipple 104, best shown in Fig. 3. For retaining the lubricating material within the bore 103 and the further bore 103a of the sleeve 102, so that said lubricant may lubricate the shaft 45, the sleeve portion 102 is threaded for a plug 105 which maintains the end thereof closed against the escape of lubricant. The part of sleeve portion 102 of operator 101 which is outside the casing 21 is serrated at 102a for suitable connection with the link 18a. The link 18a is secured about serrations 102a much as handle 20 is secured through its sleeve 61 to serrations 60 of the direction controller sleeve 44. Downward movement of pedal 12 will, through links 18 and 18a, rotate operator 101 on the axis of shaft 45.

The operator 101 when rotated by depression of pedal 12, cooperates with the head 96 of the rivet carried by ratchet plate 95, as is best seen in Figs. 4 and 12, so as to move the ratchet plate 95 and therefore the speed controller sleeve 78. This connection is of course a one-way connection, since while the operator 101 will cause the sleeve to move clockwise in Fig. 4, and counterclockwise from its position of Fig. 12 to its full line position in Fig. 13, operator 101 is not capable of moving the speed control sleeve 78 in a reverse direction, as when the pedal 12 is allowed to move upwardly to its position of Figs. 1 and 2, under the influence of spring 15. It will be remembered, however, that the spring 88 described previously tends at all times to maintain the speed controller sleeve 78 in a neutral position illustrated in Fig. 12. Therefore, were no other means provided, the depression of the pedal 12 would act through the operator 101 to move the ratchet plate 95 and the speed controller sleeve 78 to its first speed position illustrated in Fig. 13, while reverse movement of the pedal 12 and operator 101 would simply allow the spring 88 to function to return the speed controller sleeve 78 to its neutral position of Fig. 12.

The pawl 98 previously described as cooperating with the ratchet teeth 97 prevents this reverse movement of controller sleeve 78, as is well illustrated in Fig. 13, wherein the pawl 98 is shown as engaged in the first tooth 97 of the ratchet plate 95 holding the speed controller sleeve 78 in first speed position. As the operator 101 is moved to advance the speed controller into other speeds, it is readily seen that the pawl 98 will enter successive teeth of the ratchet teeth 97 and will prevent the speed controller from moving from one speed position into a less advanced speed position. Similarly, should the speed controller be advanced by handle 19 into an advanced speed position, the pawl 98 would likewise act to prevent return of the controller sleeve 78 to neutral.

The operator 101 has a function in addition to the moving of the speed controller through its various speed positions through the head 96 of the ratchet plate rivet. Thus, it will be observed that when the operator 101 is in its position of Fig. 12, it maintains the pawl 98 in a position which is the same as its dotted line position of Fig. 13; that is, out of the path of any of the teeth 97 of the ratchet 95. Therefore, while reverse movement of the operator 101 from any position to which it has advanced the speed controller through ratchet 95 will be independent of that speed controller, once the operator reaches a position corresponding to its full line position of Fig. 12 and its dotted line position in Fig. 13, it will move the pawl 98 in the direction of the arrow 98a in Fig. 13 and out of contact with a particular tooth 97 of the ratchet plate 95.

This will immediately allow spring 88 to return the speed controller sleeve 78 to its neutral position illustrated in Fig. 12, and also shown in Figs. 4 and 11. Because of this construction, it is readily perceived that when the speed controller is foot or hand operated, it is advanced from one speed position to another, and that it is impossible to return the controller from any advanced speed position to a lesser advanced speed position without releasing the controller for movement back into its neutral position by withdrawing pawl 98 from ratchet teeth 97. This can only be done by upward movement of the pedal 12 and the resulting movement of operator 101. Also, regardless of the speed position to which the speed controller sleeve 78 is moved, upward movement of the pedal 12 will release the sleeve for movement to neutral, this contributing a valuable control feature, as those skilled in the art will appreciate.

Should the truck operator, where manual control by a handle 19 is provided, obstruct the action of the spring 88 by holding handle 19 when the pawl 98 is released from the teeth 97, the speed controller sleeve 78 will not return to neutral position. I have incorporated in my controller mechanism, means whereby this holding will not prevent the controller from breaking the motor circuit. In addition, these means make it necessary to move the sleeve 78 to neutral position once operator 101 has been allowed to move back to the position of Fig. 12, if the controller is to function to advance the motor through its various speeds.

The mechanism for requiring a return of the speed controller sleeve 78 to its neutral or first speed position prior to its advancement through the several speeds, is associated with a contactor circuit for preventing arcing between the movable contact members 58 carried by speed controller sleeve 78 and the stationary segment contacts 36—40 of the molded insulation members 35 of Figs. 21 and 22. This contactor circuit is also controlled by the operator 101, as will now be described before the said mechanism is described.

As is probably best illustrated in Figs. 12 and 13, the operator 101 when moved from the position of Fig. 12 to the full line position of Fig. 13 not only moves the ratchet 95 and its speed controlled sleeve 78 into the first speed full line position of Fig. 13, but also moves a switch lever 106 from the position of Fig. 12 to the full line position of Fig. 13. This movement of the switch lever 106 releases contact pin 107 for movement from the position of Fig. 12 to the position of Fig. 13 under the influence of an appropriate spring 109 shown in Fig. 18. This movement closes a circuit through the switch 108. The operation of switch 108 and spring 109 is shown only diagrammatically, since any switch which will close a circuit upon movement of operator 101 to its full line position of Fig. 13, will readily contribute the results I desire.

It is important to note that the relation of the operator 101 to the rivet head 96 of the ratchet plate 95 and the switch lever 106, is such that operator 101 will first move the ratchet plate 95 and controller sleeve 78 to the first speed position of Fig. 13, and will then, while sleeve 78 is in first speed position, move the lever 106 sufficiently to cause a closing of the circuit through switch 108.

In Fig. 18, I show the contact brush members 58 over the first speed segments 37, while the switch lever 106 is held by operator 101 in a position to permit a closing of the circuit at 108. The speed circuit through contacts 37 and 58, and for that matter every other speed circuit, is so designed that it is essential that the switch 108 be closed in order that any speed circuit be closed. Therefore, since contact is first made by contact members 58 and 37, and only thereafter is the switch 108 closed, it is readily seen that no arcing will occur between the contacts 58 and 37 at the time that those contacts touch. It is the contacts of the contactor circuit later closed through the closing of switch 108 which absorb the arcing.

In order to insure that no arcing will take place when contacts 58 move away from contact segments 37 in moving to a neutral position over the segments 36, I arrange for operator 101 to release the switch lever 106 for movement by its relatively powerful spring 106a into position to open the circuit at 108 just prior to the moment that the pawl 98 is released from out of engagement with a particular one of the teeth 97 of the ratchet plate 95. Therefore, the contactor circuit of which the switch 108 is a part, is broken prior to the movement of the contacts 58 from the contact segments 37, so that there is no current flowing between the contacts 58 and 37 when they separate, this of course eliminating any possibility of arcing therebetween.

I shall now refer more particularly to Fig. 18 to show just how my controller is wired to compel the return of the contacts 58 to first speed position prior to movement to any advanced speed position once the contacts are released by movement of pawl 98 out of ratchet teeth 97 by the upward movement of operator 101 when the foot pedal 12 is released.

When the contacts 58 are first brought over the contact segments 37 by operator 101, the switch 108 is open, but further movement of the operator 101 while the contacts 58 are still over the segments 37 will cause the closing of the switch 108, as is best illustrated in Fig. 18. This will close a circuit from the positive side of the line at 110 through conductor 111, contacts 37 and 58, through conductor 59a connecting the contacts 58, thence through conductors 112, 113, 114, switch 108, contactor relay 115 to the minus side of the line at 116.

The excitation of the contactor relay 115 will cause its armature 117 to move upwardly, closing a circuit between the points 118. At the same time, a second armature 119 operated by the contactor relay 115 will close a circuit across the points 120. As soon as the contacts 120 are bridged by the armature 119, a circuit will be closed through conductor 110, conductor 121, armature 119, contacts 120, conductor 114, switch 108, relay 115 and conductor 116 to the negative side of the line.

This will mean that the circuit of the contactor relay 115 will be closed independently of the controller contacts 37 and 58, so that the movable contacts 58 may proceed to positions over the advanced speed contact segments 38, 39 and 40 without disturbing the circuit of the contactor relay 115, and therefore without opening the circuit closed by armature 117 through contacts 118.

The closing of the circuit at 118, 117 allows for a flow of electricity as follows: Through the conductor 110, the entire traction resistance 122, conductor 123, through the field coils 124 of motor M and armature 125, as may be determined by the placing of the contacts 58 of the direction controller, through the conductor 126, 127, the contacts 118 and armature 117 to the negative side of the line at 116. Since all of the traction resistance 122 is at this point placed in the motor circuit, the motor will naturally operate in first speed, which is the speed corresponding to contact segments 37.

Should the speed contacts 58 now be placed over the contacts 39 corresponding to third speed, flow of current will be as follows: Through contacts 110, contact segments 39, as bridged by movable contacts 58, conductor 128 to contact point 129, thence through a small portion of the traction resistance 122 and the conductor 123, through the field coils 124 and the armature 125, as directed by the direction controller contacts 58, conductors 126 and 127, to the negative side of the line at 116. Those who are skilled in the art will readily understand just how the traction resistance is varied through the remaining contacts to obtain the other speeds.

With the speed controller contacts 58 over the stationary segments 39 as just described, should it be desired to go back into second speed corresponding to the contact segments 38, it will be necessary to release the pawl 98 from a suitable one of ratchet teeth 97, since otherwise the ratchet plate 95 secured to the speed controller sleeve 78 which carries the contacts 58 cannot move in a backward direction as has already been indicated.

When the operator 101 is moved to a position to release the pawl 98 from the teeth 97, it first allows the switch lever 106 to open the contactor circuit at 108. Once this is done, it is readily perceived that the circuit through the contactor relay 115 is immediately broken, thus breaking the circuit through armature 118 and contacts 117 which thus shuts off the flow of electric current through the motor. Simultaneously, the circuit through armature 119 and contacts 120 is opened so that the circuit through the contactor circuit at this point is also broken. It will now be appreciated that it is impossible to close the circuit through the contactor relay 115 once again except through the stationary segments 37 of the speed portion of my controller.

Therefore, in order to put the motor of the truck into any one of its speeds once the operator 101 has been moved to release the speed controller for reverse movement, it is necessary to bring the contacts 58 of the speed controller into the position shown in Fig. 18; that is, to a first speed position. In view of this, regardless of what control is exercised over the speed controller, it is absolutely essential when wishing to go from an advanced speed to a less advanced speed, to put the motor into first speed and go through the speeds. This feature is of extreme importance, and it is thought it has now been amply described.

As will be appreciated by those skilled in the art, it is very desirable that the movable contacts 58 be not moved swiftly through the various speed positions. Since, as has been described, it is impossible to close the circuit through the contactor relay 115 without first closing the first speed circuit through segments 37, I use a slowly acting contactor coil 115 to prevent a swift movement of my contacts 58 through the first speed position. The slow action of my contactor is easily obtained, as will be appreciated by those skilled in electrical arts. Since the contactor relay 115 acts quite slowly and therefore will take some definite period of excitation prior to pulling its armature 119 into position to close its own circuit through the contacts 120, it will be understood that the contacts 58 must remain in first speed a sufficient period of time to allow for the contactor relay 115 to act to close its circuit at 119, 120.

This immediately slows down the operation of the movable contacts 58, since if they are moved too rapidly through first speed segments 37, contactor relay 115 will not act, and when the movable contacts 58 leave the contacts 37, the circuit through relay 115 will not be made at 119, 120 and the circuit of the motor at 117, 118 will be open. Thus, by a very simple expedient, which is a very important part of my invention, I make it impossible to move the contacts 58 rapidly through first speed, while also obtaining a non-arcing effect. The advantages of this action will of course be understood by those skilled in the art.

An important feature of my invention resides in the use of contacts 36 with which the movable contacts 58 of the speed controller cooperate when the speed controller is in neutral position. Depending upon the direction of movement of the truck down a hill, if the direction controller is maintained in a particular directional position, for example, a forward direction such as shown in Fig. 18, while the speed controller is in neutral with its movable contacts over segments 36, a circuit will be closed as follows: Through contacts 36 because of the coaction of the movable contacts 58 and conductor 59a, through the conductor 130, binding post 131, conductor 132, through a portion of the resistance 122 which may be varied by the placing of the post 133 at some point other than where it is placed, conductor 123, through the motor 125 and field coils 124 which act as a generator, conductor 126, conductor 134, back to contacts 36. It will therefore be seen that when the truck is going down hill with the speed controller in neutral, by the mere placing of the direction controller contacts 58 in the proper directional position, the motor 125 will act as a generator generating electricity which will be forced through a certain portion of the traction resistance 122, thus causing the motor to act as a brake for the truck; that is, a regenerative brake, as will be understood by those skilled in the art.

I believe that the operation of my controller will now be quite clear to those skilled in the art, but it may be well to review its operation by going through an operative cycle, as follows: When it is desired to move the truck in a forward direction, it is first necessary to place the speed controller in neutral, thus bringing the cam 84 shown in Fig. 17, into position with its portion 84a holding the pawl 76 partially out of the deep notch 49, as is illustrated in Fig. 14, it being thereafter possible to rotate the direction controller to its position of Fig. 18, which is its forward position illustrated in Fig. 15.

Since the movement of the direction controller to the forward positions of Figs. 15 and 18 is resisted by the very powerful spring 73 acting on the cam 70, as is probably best illustrated in Fig. 6, the trucker will step on the pedal 11, which, through the link 63 of Fig. 5 will rotate the shaft 65, moving cam 70 to its dotted line position of Fig. 6 against the action of spring 73, withdrawing the said cam from obstructing relation to the lugs 75 of the direction controller sleeve 44, so as to allow free action of this sleeve and free movement of the controller to a particular speed position, which is the forward speed position of Fig. 18. At any time, removal of the trucker's foot from pedal 11 will cause pedal spring 11a and spring 73 acting on cam 70 to return the direction controller sleeve 44 to neutral.

With the direction controller in a particular directional position, it is now necessary to advance the speed controller to a particular speed position, and this is done by the depression of the foot pedal 12. Where the operation is to be entirely by the foot pedal, the linkage between the foot pedal and the operator 101 is so arranged that the depression of the foot pedal will move the operator 101 so as to advance the speed controller sleeve 78 through headed rivet 96 and ratchet plate 95 through all of its speed positions. When desired, the foot pedal 12 may be arranged to move the operator 101 a sufficient distance to bring the speed controller only to first speed or second speed position, the manual means comprising handle 19 being relied upon thereafter. At all times, the spring 88 will tend to move the handle 19 and the speed controller 78 into neutral position.

Regardless of whether the operator 101 or handle 19 are used to move the speed controller through all of its speed positions, it will be appreciated that the pawl 98 will prevent movement of the speed controller sleeve from an advanced speed position to a less advanced speed position until the operator 101 is returned to the position of Fig. 12 moving the pawl 98 out of contact with the ratchet teeth 97 of the ratchet plate 95.

It will be understood that when the operator 101 moves the speed controller into first speed position, the switch 108 is open and no speed circuit is closed through first speed segments 37. Further movement of the operator 101 as to the position of Fig. 18 allows a closing of the circuit at switch 108 by depression of switch lever 106, which closes the circuit through the contactor relay 115, which closes the circuit including contacts 37, 58 through the motor M at 117, 118, thus preventing any arcing through contacts 37 and 58. Similarly, upon upward movement of the operator 101 to release the controller sleeve 78 from pawl 98 for movement to a neutral position, the circuit through the contactor relay 115 is broken at 108 before contacts 58 leave segments 37, so that the motor circuit is first broken at 117, 118, thus preventing any arcing through contacts 58 and 37.

Also, when it is desired to go from an advanced speed position to a lower speed, it is always necessary to move the pawl 98 from the teeth 97, which movement may only be brought about by an opening of the circuit through the contactor relay 115, thus causing the breaking of the conductor circuit through its armature 119 and contact points 120. Since the contactor circuit may never be re-established except through the placing of contacts 58 over contact segments 37, the speed controller must be placed in first speed position before it may be advanced through the speeds. In addition, the contactor relay 115 operates so slowly to establish its own circuit at 119, 120 that movement through first speed segments 37 must be quite slow.

This description of the operation of my invention following upon the detailed description of the construction of my controller and the general description of my controller, should make the invention appear quite clear to those skilled in the art.

I now claim:

1. In a combination of the class described, a motor, a contact member movable from a neutral to an advanced speed position whereby to control the speed of said motor, a contactor circuit the closing of which is a prerequisite to the closing of the speed circuits of said motor by said contact member, detent means for locking said contact member against return from an advanced speed position to said neutral position while allowing free movement thereof to advanced speed positions, release means adapted to move said detent means out of locking position to permit return movement of said contact member, means for breaking the contactor circuit when said detent means are moved to release position, and means whereby the return of said contact member to a first speed position is a prerequisite to the closing of said contactor circuit once again.

2. In a combination of the class described, a motor, a series of motor circuits corresponding to different speeds of said motor, contacts for said circuits, a contact member movable from a neutral position relatively to said contacts for closing said speed circuits, detent means for locking said contact member against return movement from an advanced speed circuit closing position to a less advanced speed circuit closing position, a contactor circuit including the first speed contacts and the closing of which contactor circuit is a prerequisite to the closing of any speed circuit, means whereby said contactor circuit remains closed when said contact member moves away from said first speed contacts, means for moving said detent means to release said contact member for movement from an advanced speed circuit closing position to a less advanced speed circuit closing position, and means whereby said contactor circuit is opened prior to the moving of said detent means to release said contact member for said movement, the return of said contact member to first speed position being thereafter a prerequisite to the closing of said contactor circuit thereafter.

3. In a combination of the class described, a motor, a series of motor circuits corresponding to different speeds of said motor, a rotatable contact member movable through a path to close said circuits, an operator for rotating said contact member, a one way connection between said operator and said contact member whereby said operator rotates said contact member from a neutral to an advanced speed position, said one way connection permitting movement of said operator back to a position corresponding to a predetermined speed independently of said contact member, spring means for returning said contact member to a predetermined speed independently of said operator, a ratchet secured to said contact member, a pawl cooperable with said ratchet for preventing movement of said contact member from an advanced speed position to a less advanced speed position, and means whereby said operator moves said pawl to release said ratchet when said operator returns to said predetermined position.

4. In a combination of the class described, a motor, a rotatable contact member movable through a path to close a series of speed circuits corresponding to different speeds of said motor, an operator for rotating said contact member, a one way connection between said operator and said contact member whereby said operator rotates said contact member through said different speed circuits when itself moving in one direction, the said means of connection permitting return movement of said operator in a reverse direction independently of said contact member, contactor means whereby the then closed speed circuit of said contact member is broken by movement of said operator in said reverse direction, detent means for holding said contact member in any speed position to which it is advanced, and means for releasing said contact member from said detent means and for returning said contact member to neutral position when said speed circuit is opened by said movement of the operator in said reverse direction.

5. In a combination of the class described, a motor, a contact member movable from a neutral position through a series of positions for closing several graduated speed circuits of said motor, an operator for moving said contact member, means of connection between said operator and said contact member whereby said operator so moves said contact member when itself moved in one direction, while allowing reverse movement of said operator independently of said contact member, means for moving said contact member in a reverse direction independently of said operator, detent means for locking said contact member against reverse movement from an advanced speed circuit closing position to a less advanced speed circuit closing position when said operator is moved reversely, a contactor circuit the closing of which is a prerequisite to the closing of any speed circuit, means whereby said operator when moved reversely moves said detent means to release said contact member for movement from an advanced speed circuit closing position to a less advanced speed circuit closing position, and means whereby said contactor circuit is opened by said operator prior to the moving of said detent means to release said contact member for said movement.

6. In a combination of the class described, a motor, a movable contact member, a manually operated lever for advancing said controller from a neutral position to an advanced speed position whereby to control the speed of said motor, spring means tending at all times to return said movable contact member to a neutral position, pawl and ratchet mechanism for preventing the return of said movable contact member to neutral, a foot operated treadle, treadle operated means whereby when said foot operated treadle is in raised position said pawl and ratchet means will be disengaged and said spring means will return said movable contact member to neutral, said treadle operated means being movable when said treadle is depressed to allow engagement of said pawl and ratchet means to hold said movable contact member in its speed positions, means of connection between said foot operated treadle and said movable contact member whereby depression of said foot operated treadle also moves said movable contact member from neutral to its advanced speed positions, a contactor circuit the closing of which is a prerequisite to the closing of any of said speed circuits, and a switch for said circuit closed by the depression of the foot operated treadle.

7. In a combination of the class described, a motor, a movable contact member, a manually operated lever for advancing said contact member from a neutral position to an advanced speed position whereby to control the speed of said motor, spring means tending at all times to return said movable contact member to a neutral position, pawl and ratchet mechanism for preventing the return of said movable contact member to neutral, a foot operated treadle, treadle operated means whereby when said foot operated treadle is in raised position said pawl and ratchet means will be disengaged and said spring means will return said movable contact member to neutral, said treadle operated means being movable when said treadle is depressed to allow engagement of said pawl and ratchet means to hold said movable contact means in its speed positions, a contactor circuit the closing of which is a prerequisite to the closing of any of said speed circuits, and a switch for said contactor circuit closed when said foot operated treadle is moved to a predetermined depressed position.

8. In a combination of the class described, a motor, a movable contact member, a manually operated lever for advancing said contact member from a neutral position to an advanced speed position whereby to control the speed of said motor, pawl and ratchet mechanism for preventing a reverse movement of said movable contact member, a foot operated treadle, means whereby lifting of said foot operated treadle releases said pawl and ratchet to allow reverse movement of said contact member, and a controlling switch for the speed circuits including said contact member adapted to be opened by the said lifting of said foot operated treadle.

9. In a combination of the class described, a motor having a series of speed circuits, a rotatable contact member movable through a path to close said circuits whereby to control the speed of said motor, an operator having a one way connection with said contact member for rotating said contact member from neutral to an advanced speed position, means whereby the return of said operator from an advanced speed position to a predetermined position while said contact member remains in said advanced speed position to a prerequisite to the return of said contact member from said advanced speed position, a contactor switch for said speed circuits, means whereby said operator effects the closing of said contactor switch immediately after said rotatable contact member closes its first speed circuit and while said first speed circuit remains closed, the said operator opening said conductor circuit upon its return movement to a predetermined speed position in advance of the return of said contact member from its advanced speed position.

10. In a combination of the class described, a motor, a motor having a series of speed circuits, a rotatable contact member movable through a path to close said circuits whereby to control the speed of said motor, an operator for rotating said contact member, a one way connection between said operator and said contact member whereby said operator rotates said contact member from a neutral to an advanced speed position, said one way connection permitting movement of said operator back to a position corresponding to a predetermined speed independently of said contact member, spring means for returning said contact member to a predetermined speed position independently of said operator, a detent for holding said contact member against said return movement, means whereby said detent is released by said operator when said operator returns to said predetermined position, a contactor switch for the said speed circuits, and means whereby said contactor switch is opened by said operator prior to the release of said detent.

11. In a combination of the class described, a motor having a series of speed circuits, a rotatable contact member movable through a path of close said circuits whereby to control the speed of said motor, an operator for rotating said contact member, a one way connection between said operator and said contact member whereby said operator rotates said contact member through said different speed circuits when itself moving in one direction, the said means of connection permitting movement of said operator in a reverse direction independently of said contact member, means for moving said contact member in a reverse direction independently of said operator, a detent for preventing said reverse movement of said contact member, said detent being movable to release said contact member when said operator returns to a predetermined position, a contactor circuit for controlling said speed circuits, and means whereby said contactor circuit is opened by said operator just prior to its moving the said detent to release said contact member.

12. In a combination of the class described, a motor having a series of speed circuits, a rotatable contact member movable through a path to close said circuits whereby to control the speed of said motor, an operator for rotating said contact member, a one way connection between said operator and said contact member whereby said operator rotates said contact member through said different speed circuits when itself moving in one direction, the said means of connection permitting movement of said operator in a reverse direction independently of said contact member, means for moving said contact member in a reverse direction independently of said operator, a detent for preventing said reverse movement of said contact member, means whereby said detent releases said contact member when said operator returns to a predetermined position, a foot operated pedal for actuating said operator, and a manually operated lever connected to said contact member for rotating it to an advanced speed position while said operator remains in a predetermined speed position.

13. In a combination of the class described, a motor having a series of speed circuits, a rotatable contact member movable through a path to close said circuits whereby to control the speed of said motor, an operator having a one way connection with said contact member for rotating said contact member from neutral to an advanced speed position, means whereby the return of said operator from an advanced speed position to a predetermined position while said contact member remains in said advanced speed position is a prerequisite to the return of said contact member from said advanced speed position, a contactor switch, means whereby said operator effects the closing of said contactor switch immediately after said rotatable contact member closes its first speed circuit and while said first speed circuit remains closed, the said operator opening said contactor circuit upon its return movement to said predetermined position in advance of the return of said contact member from its advanced speed position, a foot operated pedal for actuating said operator, and a manually operated lever connected to said contact member for rotating it to an advanced speed position while said operator remains in a predetermined speed position.

14. In a combination of the class described, a motor having a series of speed circuits, a movable contact member for closing said speed circuits, a manually operated lever for advancing said contact member from a neutral position to an advanced speed circuit closing position, means for returning said contact member to neutral position, pawl and ratchet mechanism for preventing a return movement of said movable contact member, a foot operated treadle having a one way connection with said movable contact member for advancing said contact member, and means whereby the return movement of said treadle actuates said pawl and ratchet means to allow return movement of said contact member.

15. In a combination of the class described, a motor having a series of speed circuits, a movable contact member, a manually operated lever for advancing said contact member from a neutral position to an advanced speed circuit closing position, spring means tending at all times to return said movable contact member to a neutral position, pawl and ratchet mechanism for preventing the return of said movable contact member to neutral, a foot operated treadle, treadle operated means whereby when said foot operated treadle is in raised position said pawl and ratchet means will be disengaged and said spring means will return said movable contact member to neutral, a contactor switch for said speed circuits maintained open when said treadle is in raised position, said treadle operated means being movable when said treadle is depressed to allow engagement of said pawl and ratchet means to hold said movable contact means in its speed positions and to effect the closing of the said contactor switch.

16. In a combination of the class described, a motor having a series of speed circuits, a movable contact member, a manually operated lever for advancing said contact member from a neutral position to an advanced speed circuit closing position, spring means tending at all times to return said movable contact member to a neutral position, pawl and ratchet mechanism for preventing the return of said movable contact member to neutral, a foot operated treadle, treadle operated means whereby when said foot operated treadle is in raised position said pawl and ratchet means will be disengaged and said spring means will return said movable contact member to neutral, said treadle operated means being movable when said treadle is depressed to allow engagement of said pawl and ratchet means to hold said movable contact member in its speed positions, and means of connection between said foot operated treadle and said movable contact member whereby depression of said foot operated treadle also moves said movable contact member from neutral to advanced speed positions.

17. In a combination of the class described, a motor having a series of speed circuits, a rotary contact member rotatable from a neutral position to an advanced speed circuit closing position, a spring tending at all times to return said contact member to neutral position from any advanced speed position, a pawl and ratchet engaged to maintain said rotary contact member against movement backward from any advanced speed position, an operator having a one way connection with said rotatable contact member whereby forward movement of said operator rotates said contact member to an advanced speed position while permitting said operator to move backwardly relatively to said rotatable contact member when said contact member is held against backward movement, means whereby when said operator moves backwardly to a predetermined position it disengages said pawl from said ratchet to allow said spring to return said rotatable contact member to neutral position, a contactor switch, and means whereby it is closed when said operator is moved forwardly a distance sufficient to move said rotary contact member to first speed and is opened just prior to the release of the pawl and ratchet mechanism by the backward movement of said operator.

18. In a combination of the class described, a motor having a series of speed circuits and contacts through which said circuits are closed, a rotatable contact member having contacts and movable relatively to said speed circuit contacts to close said speed circuits, an electromagnetic contactor, a switch for said speed circuits closed upon excitation of said electromagnetic contactor, a circuit for said electromagnetic contactor including the first speed contacts, means whereby the said contactor circuit is established independently of said first speed contacts once said contactor is properly excited by the closing of said first speed circuit, said means maintaining said contactor circuit closed while said contact member rotates into advanced speed circuit closing positions, said means having a predetermined inertia whereby the contactor circuit through said first speed contacts must remain closed a predetermined interval in order that said means function to close the contactor circuit independently of said first speed contacts, whereby a fast movement of said rotatable contacts through said first speed will be ineffective to close said contactor circuit.

19. In a combination of the class described, a motor having a series of speed circuits, movable and stationary contacts arranged so that said movable contacts when moved relatively to said stationary contacts close said speed circuits, an electromagnetic relay, a control switch for said speed circuits maintained closed when said electromagnetic relay is excited, a circuit for said electromagnetic relay including certain of said movable and stationary contacts which are in engagement for closing a particular speed circuit, means for closing said electromagnetic circuit independently of said movable and stationary contacts once said circuit is closed for a predetermined period through said contacts so that said movable contacts may move relatively to said stationary contacts to close more advanced speed circuits and without incidentally effecting an opening of said electromagnetic relay circuit, whereby to require the maintenance of said circuit through said certain movable and stationary contacts for at least said predetermined period prior to the moving of said contacts to close more advanced speed circuits.

20. In a combination of the class described, an electric motor having a series of speed circuits including contacts, a rotatable contact member movable relatively to said contacts to close said speed circuits, a controlling circuit the closing of which is a prerequisite to the closing of said speed circuits, said controlling circuit including the contacts which are bridged in the first speed position of said rotatable contact member and a control switch, an operator for moving the rotatable contact member to first speed position and adapted thereafter to effect the closing of said control switch, whereby said controlling circuit is closed immediately after said contact member is moved into first speed circuit closing position, means actuated upon closing of said controlling circuit for closing said circuit independently of said contacts so as to maintain said controlling circuit closed when said rotatable contact member is moved by said operator away from said contacts toward advanced speed circuit closing position, said means having predetermined inertia whereby the controlling circuit through said contacts must remain closed a predetermined interval in order that said means function to close the controlling circuit and thereby allow the closing of advanced speed circuits by the further movement of said contact member, the movement of said operator in a direction reverse to that in which it moves said contact member into advanced speed circuit closing positions, opening said control switch prior to the reverse movement of said rotatable contact member out of the first speed circuit closing position.

21. In a combination of the class described, an electric motor having a series of speed circuits, a rotatable contact member movable through a path to close successively said speed circuits, an operator for rotating said contact member, a one way connection between said operator and said contact member whereby said operator rotates said contact member through said different speed circuit closing positions when itself moving in one direction, the said means of connection permitting movement of said operator in a reverse direction independently of said contact member, means for moving said contact member in a reverse direction independently of said operator, a detent for preventing said reverse movement of said contact member, means whereby said detent moves to release said contact member when said operator returns to a predetermined position, a contactor circuit for controlling said speed circuits, means whereby said contactor circuit is opened by said operator just prior to its moving the said detent to release said contact member, and means whereby said contactor circuit is thereafter closed when said contact member and operator move together to a predetermined speed position of said contact member and a related position of said operator.

22. In a combination of the class described, a motor, a series of motor circuits corresponding to different speeds of said motor, contacts for said circuits, a rotatable contact member movable through a path to close through said contacts the several speed circuits of said motor, an operator for rotating said contact member, a contactor for controlling said speed circuits, a circuit for said contactor including the contacts of the first of said speed circuits and through which said contactor circuit is closed when the first speed circuit is closed, a switch whereby said contactor circuit is closed independently of said contacts of the first speed circuit, said switch being closed by said contactor upon the closing of the contactor circuit through said first speed contacts, whereby the breaking of said contactor circuit thereafter, and the consequent opening of said switch requires the return of the contact member to said first speed circuit contacts to re-establish said contactor circuit, and means for breaking the contactor circuit.

23. In a combination of the class described, a motor, a series of motor circuits corresponding to different speeds of said motor, a rotatable contact member movable through a path to close said circuits, an operator for rotating said contact member, a one way connection between said operator and said contact member whereby said operator rotates said contact member from a neutral to an advanced speed position, said one way connection permitting movement of said operator back to a position corresponding to a predetermined speed independently of said contact member, spring means for returning said contact member to a predetermined speed independently of said operator, a ratchet secured to said contact member, a pawl cooperable with said ratchet for preventing movement of said contact member from an advanced speed position to a less advanced speed position, means whereby said operator moves said pawl to release said ratchet when said operator returns to said predetermined position, a contactor circuit the closing of which is a prerequisite to the closing of any of said speed circuits, means whereby said contactor circuit is closed just after the closing of the first of said speed circuits by said rotatable contact member, means whereby said contactor circuit is opened by said operator just prior to the release of said ratchet.

BRONISLAUS ULINSKI.